(12) United States Patent
Chen et al.

(10) Patent No.: US 9,251,133 B2
(45) Date of Patent: Feb. 2, 2016

(54) APPROXIMATE NAMED-ENTITY EXTRACTION

(71) Applicant: International Business Machines Corporation, Armonk, NY (US)

(72) Inventors: Ying Chen, San Jose, CA (US); William S. Spangler, San Martin, CA (US); Su Yan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 13/711,746

(22) Filed: Dec. 12, 2012

(65) Prior Publication Data

US 2014/0163958 A1 Jun. 12, 2014

(51) Int. Cl.
*G06F 17/27* (2006.01)

(52) U.S. Cl.
CPC .............. *G06F 17/27* (2013.01); *G06F 17/278* (2013.01); *G06F 17/2735* (2013.01)

(58) Field of Classification Search
None
See application file for complete search history.

(56) References Cited

U.S. PATENT DOCUMENTS

| | | | |
|---|---|---|---|
| 5,049,881 A | 9/1991 | Gibson et al. | |
| 5,371,499 A | 12/1994 | Graybill et al. | |
| 5,909,510 A * | 6/1999 | Nakayama | G06K 9/6842 382/173 |
| 6,466,901 B1 | 10/2002 | Loofbourrow et al. | |
| 6,470,345 B1 | 10/2002 | Doutre et al. | |
| 8,359,318 B2 * | 1/2013 | Garbe | G06F 17/301 707/622 |
| 8,689,177 B2 * | 4/2014 | Mahajan | G06F 8/61 717/107 |
| 2004/0117335 A1 * | 6/2004 | Cuddihy | G06N 5/025 706/45 |
| 2005/0166046 A1 * | 7/2005 | Bellovin | H04L 9/3218 713/165 |
| 2008/0256575 A1 * | 10/2008 | Raju | H04L 12/4625 725/39 |
| 2009/0089630 A1 * | 4/2009 | Goldenberg | G06F 17/30536 714/704 |
| 2009/0282012 A1 * | 11/2009 | Konig | G06F 17/2785 |
| 2010/0094877 A1 * | 4/2010 | Garbe | G06F 17/301 707/742 |
| 2010/0169262 A1 * | 7/2010 | Kenedy | H04W 12/08 706/50 |
| 2010/0169340 A1 * | 7/2010 | Kenedy | G06Q 30/0631 707/758 |
| 2011/0144978 A1 * | 6/2011 | Tinkler | G06F 17/2715 704/10 |
| 2012/0011150 A1 * | 1/2012 | Swaminathan | G06F 17/30675 707/770 |
| 2012/0124307 A1 * | 5/2012 | Ashutosh | G06F 11/1451 711/162 |
| 2013/0031076 A1 * | 1/2013 | Bhola | G06F 17/3066 707/706 |

(Continued)

OTHER PUBLICATIONS

Talukdar et al., A context Pattern Induction Method for Named Entiry Extraction, Proceedings of the Tenth Conference on Computational Natural Language Learning, pp. 141-148, Jun. 8, 2006.*

(Continued)

*Primary Examiner* — Richemond Dorvil
*Assistant Examiner* — Thuykhanh Le
(74) *Attorney, Agent, or Firm* — Cantor Colburn LLP

(57) ABSTRACT

According to one embodiment, approximate named-entity extraction from a dictionary that includes entries is provided, where each of the entries includes one or more words. Words are read from the entries of the dictionary, and network resources are searched to determine a frequency of occurrence of the words on the network resources. In view of the frequency of occurrence of the words located on the network resources, domain relevancy of the words in the entries of the dictionary is determined. A domain repository is created using top-ranked words as determined by the domain relevancy of the words. In view of the domain repository, signatures for both the entries of the dictionary and strings of an input document are computed. The strings of the input document are filtered by comparing the signatures of the strings against the signatures of the entries to identify approximate-match entity names.

10 Claims, 4 Drawing Sheets

(56) References Cited

U.S. PATENT DOCUMENTS

| | | | |
|---|---|---|---|
| 2013/0124525 A1* | 5/2013 | Anderson | G06F 17/30286 707/737 |
| 2013/0166534 A1* | 6/2013 | Yoon | G06F 17/30442 707/714 |
| 2013/0191468 A1* | 7/2013 | Dichiu | H04L 12/585 709/206 |
| 2013/0191469 A1* | 7/2013 | Dichiu | H04L 63/0263 709/206 |
| 2013/0318051 A1* | 11/2013 | Kumar | G06F 17/30156 707/692 |

OTHER PUBLICATIONS

Nadeau et al., A survey of Name Entity Recognition and Classification, Nov. 2007, John Benjamins publishing company, pp. 3-26.*

Chakrabarti et al., An Efficient Filter for Approximate Membership Checking, Proceedings of the 2008 ACM SIGMOD international conference on Management of data, pp. 805-818, Jun. 9, 2008.*

Alfonseca et al., An Unsupervised Method for General Named Entiry Recognition and Automated Concept Discovery, Proceedings fo the 1$^{st}$ International Conference on General WordNet, 2002.*

Isozaki et al., Efficient Support Vector Classifiers for Named Entiry Recognition, Proceedings of the 19th international conference on Computational linguistics—vol. 1, pp. 1-7, Aug. 24, 2002.*

Minkov et al., Extracting Personal Names from Email: Applying Named Entiry Recognition to Informal Text, Proceedings of the conference on Human Language Technology and Empirical Methods in Natural Language Processing, pp. 443-450, Oct. 6, 2005.*

Uchimoto et al., Named Entity Extraction Based on a Maximum Entropy Model and Transformation Rules, Proceedings of the 38th Annual Meeting on Association for Computational Linguistics, pp. 326-335, Oct. 3, 2000.*

Chen et al., Named Entiry Extraction for Information Retrieval, Computer Processing of Oriental Language, vol. 11, No. 4, 1998.*

IBM, "A New Indexing Method Based on Named-Entity-Recognition and Alias Generation for Chinese Search," ip.com, Sep. 30, 2006, 6 pages.

K. Chakrabarti, et al., "An efficient filter for approximate membership checking," 2008, In Proceedings of the 2008 ACM SIGMOD International Conference on Management of Data, 13 pages.

C. Huang, et al., "Automatic Discovery of Named Entity Variants—Grammar-driven Approaches to Non-alphabetical Transliterations," ACL 2007, pp. 153-156.

Y. Tsuruoka, et al., "Boosting Precision and Recall of Dictionary-Based Protein Name Recognition," In Proceedings of the ACL 2003 work-shop on Natural language processing in biomedicine—vol. 13, BioMed '03, pp. 41-48.

A. McCallum, et al., "Early Results for Named Entity Recognition with Conditional Random Fields, Feature Induction and Web-Enhanced Lexicons," In Proceedings of the Seventh Conference on Natural Language Learning at HLT-NAACL 2003—vol. 4, CONNL '03, pp. 188-191.

J. Lu, et al., "Efficient Algorithms for Approximate Member Extraction Using Signature-based Inverted Lists," In Proceeding of the 18th ACM Conference on Information and Knowledge Management, 2009, pp. 315-324.

A. Chandel, et al., "Efficient Batch Top-k Search for Dictionary-based Entity Recognition," In ICDE-2006, 10 pages.

IBM, "System and Method for Effective Vocabulary Independent Speech Retrieval Using Inverted Index with Boolean Constraints," ip.com, Mar. 4, 2009, 2 pages.

A. Arasu, et al., "Efficient Exact Set-Similarity Joins," VLDB '06, Sep. 15-16, 2006, Seoul, Korea, Copyright 2006 VLDB Endowment, 12 pages.

A. Aho, et al., "Efficient string matching: an aid to bibliographic search," Communications of the ACM, Jun. 1975, vol. 18, No. 6, 8 pages.

Y. Yang, et al. "High Performance Dictionary-Based String Matching for Deep Packet Inspection," IEEE 2010, pp. 86-90.

K. Pastra, et al., "How feasible is the reuse of grammars for Naced Entity Recognition?" In Proceedings of the Language Resources and Evaluation Conference, 2002, pp. 1412-1418.

R. Baeza-Yates, et al., "Modern Information Retrieval," Addison Wesley, 1999, pp. 19-71.

G. Little, et al., "Optimum String Match Choices in LZSS," 2010 Data Compression Conference, 1 page.

T. Poibeau, et al., "Property Name Extraction from Non-Journalistic Texts," 2001, Language and Computers, 14 pages.

N. Okazaki, et al., "Simple and Efficient Algoithm for Approximate Dictionary Matching," Proceedings of the 23rd International Conference on Computational Linguistics (Coling 2010), Beijing, Aug. 2010, pp. 851-859.

B. Bloom, "Space/time trade-offs in hash coding with allowable errors," Communications of the ACM, vol. 13, No. 7, Jul. 1970, 5 pages.

Alfonseca et al., An unsupervised method for general named entity recognition and automated concept discovery, Jan. 2002, Proceedings of the 1st international conference on general WordNet, Mysore, India, pp. 1-9.

Chen, et al., Polyuhk: A robust information extraction system for web personal names, Apr. 2009, 2nd Web People Search Evaluation Workshop (WePS 2009), 18th WWW Conference, pp. 1-7.

Minkov et al., Extracting Personal Names from Email: Applying Named Entity Recognition to Informal Text, Proceedings of the conference on Human Language Technology and Empirical Methods in Natural Language Processing, Oct. 2005, ACL, pp. 443-450.

Nadeau, et al., A survey of named entity recognition and classification, Nov. 2007, John Benjamins publishing company, pp. 3-26.

U.S. Appl. No. 13/970,707 Non-Final Office Action dated May 8, 2015, 83 pages.

* cited by examiner

APPROXIMATE NAMED-ENTITY EXTRACTION

BACKGROUND

The present disclosure relates generally to information extraction, and more specifically, to approximate named-entity extraction.

Named-entity extraction seeks to extract entities, such as names of people, addresses, drug names, and the like from unstructured text. There are three major categories of named-entity extraction methods: statistical-model based methods, linguistic-grammar based methods, and dictionary based methods.

Statistical-model based methods automatically learn patterns about entities and text from labeled training data, and generalize the learned patterns to new text to extract entities. The drawback of such methods is that a large amount of manually labeled data is required to construct a good model. The labeled data are typically very time intensive to generate, which hinders the applicability of these types methods in many real named-entity extraction systems.

Linguistic-grammar based methods are known for high extraction precision but at a cost of lower recall. The major drawback is that these methods require experienced computational linguists and domain experts to invest months of work to compose all the rules.

Dictionary based methods perform look-up based matching. Given a dictionary of named-entities (for example, the names of all employees of a company), a dictionary-based method extracts all of the strings from text that match a dictionary entry as an entity name. In contrast to statistical-model based methods and linguistic-grammar based methods, a dictionary-based method does not require any manually labeled data or any domain expertise. A dictionary-based method does not limit the possible types of entities it handles and can be applied to multiple domains. Dictionary-based methods can perform exact string matching efficiently but suffer from low recall, since the surface form of a name from unstructured text can vary substantially from its dictionary version. Alternatively, approximate string mapping can be performed to identify all of the strings having similarity scores to a dictionary entry above a threshold as entity names. Approximate string matching can achieve both high precision and high recall but typically suffers from a very high computational cost.

BRIEF SUMMARY

An exemplary embodiment includes a computer program product for approximate named-entity extraction from a dictionary that includes entries, where each of the entries includes one or more words. The computer program product includes a computer readable storage medium having computer readable program code embodied therewith, the computer readable program code being executable by a computer to perform a method. The method includes reading words from the entries of the dictionary. Network resources are searched to determine a frequency of occurrence of the words on the network resources. In view of the frequency of occurrence of the words located on the network resources, domain relevancy of the words in the entries of the dictionary is determined. A domain repository is created using top-ranked words as determined by the domain relevancy of the words. In view of the domain repository, signatures for both the entries of the dictionary and strings of an input document are computed. The strings of the input document are filtered by comparing the signatures of the strings against the signatures of the entries to identify approximate-match entity names.

Further exemplary embodiments include a system for approximate named-entity extraction. The system includes memory having computer readable computer instructions and a dictionary that includes entries, where each of the entries includes one or more words. The system also includes a processor for executing the computer readable instructions to perform a method. The method includes reading words from the entries of the dictionary. Network resources are searched to determine a frequency of occurrence of the words on the network resources. In view of the frequency of occurrence of the words located on the network resources, domain relevancy of the words in the entries of the dictionary is determined. A domain repository is created using top-ranked words as determined by the domain relevancy of the words. In view of the domain repository, signatures for both the entries of the dictionary and strings of an input document are computed. The strings of the input document are filtered by comparing the signatures of the strings against the signatures of the entries to identify approximate-match entity names.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments described herein are directed to approximate named-entity extraction using dictionary-based methods. For fast string matching, a signature is created for every dictionary entry (which is a string) and every string of text in a document. A signature can be considered as a "representative" of a string. If the signatures of two strings are different, the two strings cannot be an approximate match. The signatures are used to quickly filter out candidate string-matching pairs to save computation. Network resources, such as content on the World-Wide Web, are leveraged as a universal knowledge base or universal repository in generating signatures.

An inverted index of a dictionary can be constructed for fast dictionary lookup. Given a document string, when querying a traditional inverted index, it is possible that a relatively large number of dictionary entries will be returned as potential candidate matches. Performing string similarity comparisons between the document string and a large set of dictionary entries is computationally expensive. In exemplary embodiments, by storing extra numeric fields for each dictionary entry in the inverted index, a length-based inverted index is constructed. For example, the length-based inverted index can include two extra numeric fields which are small in size and thus barely increase the index size. The numeric fields efficiently decrease the size of candidate dictionary entries by providing additional constraints and therefore reduce computational cost.

Figure 1:
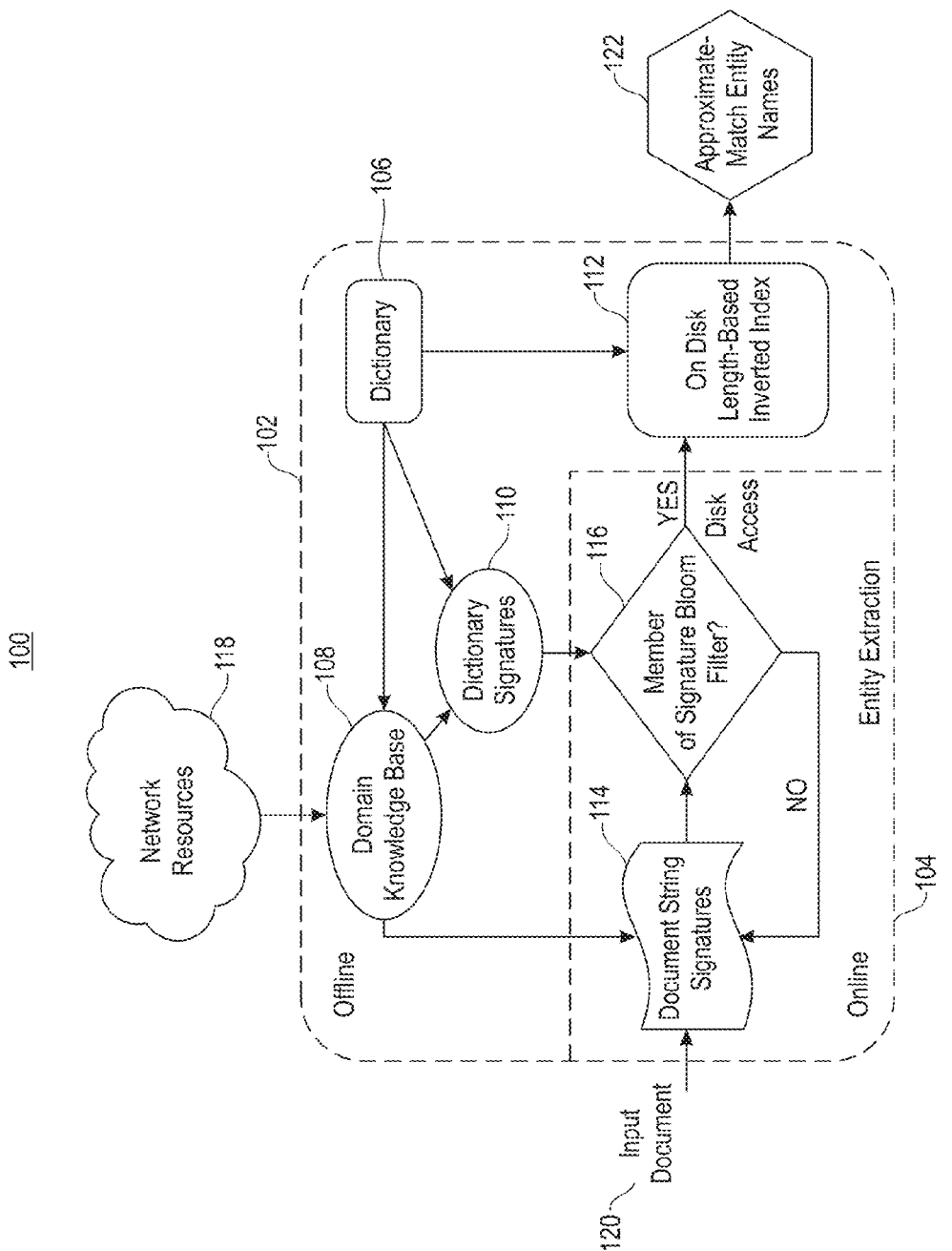
FIG. 1 depicts a system for approximate named-entity extraction in accordance with an embodiment.

Turning now to FIG. 1, a system 100 for approximate named-entity extraction using dictionary-based methods is depicted according to an embodiment. The system 100 includes an offline preprocessing component 102 and an online annotation component 104. The offline preprocessing component 102 includes a dictionary 106, a domain knowledge base 108, dictionary signatures 110, and a length-based inverted index 112. The online annotation component 104 includes document string signatures 114 and signature Bloom filter logic 116. Network resources 118, such as content from the World-Wide Web, are provided as input to the offline preprocessing component 102. An input document 120 is provided as input to the online annotation component 104.

In the example of FIG. 1, the dictionary 106 provides input to the domain knowledge base 108, the dictionary signatures 110, and the length-based inverted index 112. The domain knowledge base 108 is an example of a domain repository. The domain knowledge base 108 receives input from the network resources 118 and provides input to the dictionary signatures 110 and the document string signatures 114. The document string signatures 114 are determined based on input document 120. The signature Bloom filter logic 116 determines whether the document string signatures 114 match the dictionary signatures 110 formatted as a Bloom filter, where positive matches are passed to the length-based inverted index 112. The length-based inverted index 112 of the offline preprocessing component 102 is used to generate approximate-match entity names 122.

The dictionary 106 defines a domain. Words used in expressing entity names in the dictionary 106, however, are not all domain-related, as some are common English words. For example, in a drug name "brevicon 21 day", the word "brevicon" is domain-related while words "21" and "day" are common English words and therefore domain-irrelevant. The domain-related part of an entity name is more important in entity extraction. For instance, given a dictionary entry of "brevicon 21 day", strings "brevicon 0.5/35", "brevicon" or "brevicon 28 days" can be identified as candidate approximate-match drug names since they all share the same domain-related word "brevicon".

The contents of the dictionary 106 can be formally defined as $D=\{y_i\}$, $i=[1, n]$, where the dictionary 106 is a set of n entries/entities. Each entry $y_i$ is a string, represented as a set of tokens $y_i=\{t_1^i, \ldots, t_j^i\}$. $|D|$ is the size of the dictionary 106 and $|y_i|=l$ is the length of entry $y_i$, where a token is a basic element of a string. All of the tokens from the dictionary 106 make a vocabulary, denoted as $A=\{t_1, \ldots, t_n\}$. Depending on the underlying data or specific requirements of the system 100, there are multiple ways to define a token. For example, a token can be an English word, a character-level n-gram or a word-level n-gram. In an embodiment, every string with spaces is tokenized. By treating a string as a set of tokens, the content of a string is considered independent of the order of tokens but depends on which tokens are being used.

A maximum string length is defined as L. A document V, such as the input document 120, with m tokens is a set of strings $V=\{\{x_1^1, \ldots, x_L^1\}, \ldots, \{x_1^m, \ldots, x_L^m\}\}$, where $\{x_1^i, \ldots, x_L^i\}$ is the set of L strings generated at token position $t_i$. That is, $x_1^i=\{t_i\}$ and $x_j^i=\{t_i, t_{i+1}, \ldots t_{i+j-1}\}$. L can be selected as $L=\max(|y_i|)+\alpha$, where $\alpha$ is a small positive integer. In other words, any document string that is much longer than the longest dictionary entry can safely be ignored.

Since a string is treated as a set of tokens, Jaccard similarity, which is a statistic used for comparing similarity and diversity of sample sets, can be used as a measure of the similarity of two strings. Given a query string x and a dictionary entry y, the Jaccard similarity is $$sim(x, y) = J(x, y) = \frac{|x \cap y|}{|x \cup y|}.$$

Given a dictionary $D=\{y\}$ and an input document $V=\{x\}$, both treated as sets of strings, the task of named entity extraction is to identify a sub set of all strings, $X_{q,\delta} \subset V$, such that $X_{y,\delta}=\{x \in V | sim(x,y) \geq \delta\}$, where $sim(x,y)$ represents the similarity between two strings x and y, and $\delta \in [0,1]$ is a preferred threshold, assuming that the similarity value is normalized to a range of [0,1]. $\delta \leq 1$ represents a general case for approximate string matching.

The offline preprocessing component 102 builds the domain knowledge base 108, also referred to as domain knowledge base N, given the dictionary 106, by pruning away common English words from the dictionary vocabulary. The offline preprocessing component 102 creates a signature d for every dictionary entry and document string based on domain knowledge base N. A signature captures the domain-related information (or the pith) of a string and is stored in dictionary signatures 110. Accordingly, if the signature of a document string does not match with the signature of a dictionary entry, e.g., $d(x) \neq d(y)$, there is no need to further evaluate $sim(x,y)$. In this way, the number of candidate document strings ($L \times |V|$) is significantly reduced and therefore the number of computationally expensive string comparisons is also reduced.

For the dictionary 106, the offline preprocessing component 102 tokenizes all dictionary entries where A is the dictionary vocabulary that contains all of the unique tokens. Therefore, $A=N+N^{\perp}$, where N is the domain knowledge base 108 that contains domain-related tokens, while $N^{\perp}$ contains domain-irrelevant tokens. A token is considered to be more important if it is more domain related. Existing approximate dictionary lookup methods use inverted document frequency (idf) or term frequency inverted document frequency (tfidf) metrics to rank tokens. Both metrics originate from an information retrieval domain. The idf metric treats a token as less important if it appears in more documents, because such tokens are less discriminative. The tfidf metric combines a term frequency (tf) metric with idf. If a token appears more often within one document and appears in only a few documents, the token is considered to be more important.

Although idf and tfidf metrics give good word ranking for text search in information retrieval systems, it can be problematic to directly apply them to named-entity extraction systems. A token that appears in a large number of dictionary entries (thus has low idf value) is often domain-related. For example, in a dictionary formed from the National Center for Biotechnology Information gene database, the token "ribosomal" is one of the most frequent tokens, and appears in far more dictionary entries than common words such as "repeat", "box", "heavy", "long", etc. However, the idf metric assigns this token very low rank. The tfidf metric also does not work well for this example. Entity names are typically much shorter than documents. Most of the tokens that appear more than once within a name are prepositions, conjunctions or other functional words, such as "in", "a", "and" etc. These types of words should not be highly ranked, since they are not domain related.

Figure 2:
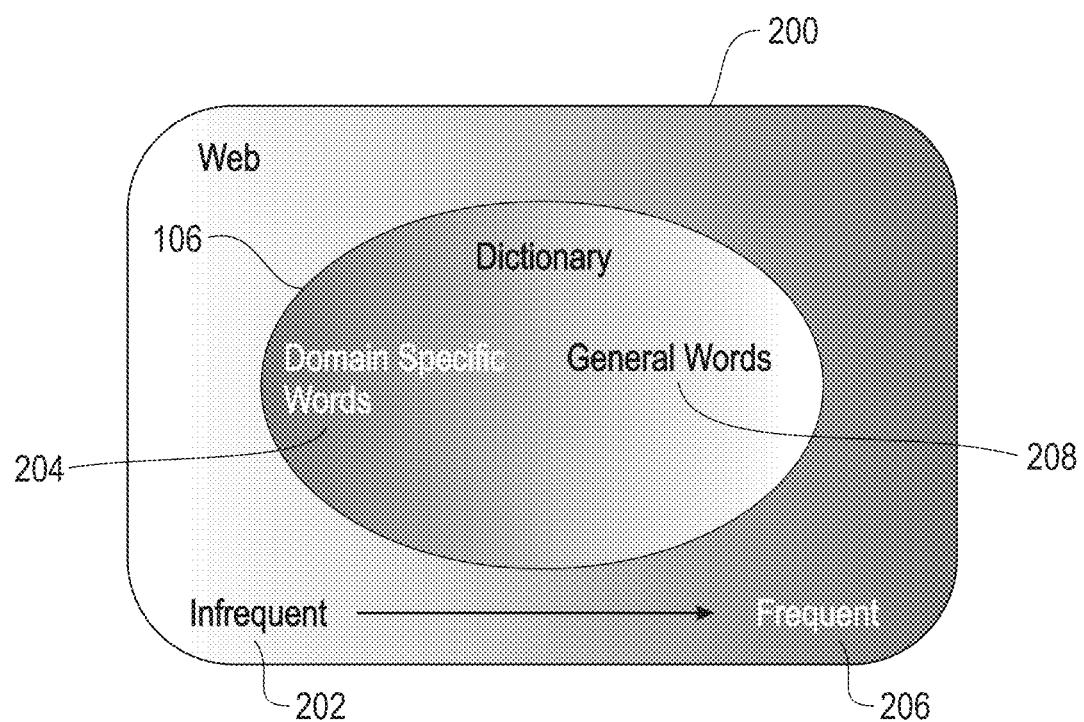
FIG. 2 depicts a relationship of Web content frequency to specific and generic words in a dictionary in accordance with an embodiment.

In exemplary embodiments, the offline preprocessing component 102 ranks the tokens with the help of the network resources 118, such as content from the World-Wide Web (also referred to generically as the "Web"). The Web can be considered as a general knowledge base. This knowledge base is general enough to cover information from every domain, but overall, the Web is not domain specific. Based on this observation, any word that appears frequently on the Web is a general word shared by all the domains. Words that appear less frequently on the Web tend to be domain specific. This is illustrated in FIG. 2, where infrequent words 202 in Web content 200 better align with domain specific words 204 of the dictionary 106, while frequent words 206 in Web content 200 better align with general words 208 of the dictionary 106.

Every token in A with metric $W_{rank}$ is defined as:

$$W_{rank}(t) = \frac{\#\text{Web pages}}{\#\text{Web pages contain } t} = \frac{1}{\text{Web frequency of token } t}$$

Since the total number of Web pages is constant for all the tokens, in practice, Wrank(t) can be evaluated as the inverse of the total number of Web pages that contain t. The offline preprocessing component 102 sorts and selects the top k tokens based on Wrank(t) results to compose the domain knowledge base N. The value of k can be selected by observing the distribution of token-Web frequencies.

Given a dictionary entry $y=\{t_1, \ldots, t_p\}$, the offline preprocessing component 102 creates its signature $d(y)=[t_1^d, \ldots, t_q^d]$ as an ordered list of tokens, where $t_i^d \in N$, $i=[1,q]$, and $t_1^d, \ldots, t_q^d$ are sorted alphabetically. Note that in some rare cases, all of the tokens of a string are common English words. For example, the fly gene "similar" (sima) is also a common English word. For such strings, the offline preprocessing component 102 uses the highest ranked token to compose its signature. That is $d(y)=\{t | \min W_{rank}(t_i), t_i \in x, t_i \in N^1\}$. Signatures d(y) are stored in the dictionary signatures 110.

When handling digits, the value of a digit and its format are typically irrelevant in entity extraction. For this reason, when generating signatures, a token with digits is normalized by reducing consecutive digits into "9" and removing punctuation marks (for example, token "15%" will be normalized as "9"), and all of the tokens with digits are kept in signatures.

Given the domain knowledge base N and an input document, such as domain knowledge base 108 and input document 120, for every query string x, a signature d(x) is created using a similar process as used for creating signature d(y) and stored in the document string signatures 114. If d(x) does not match any dictionary entry signature d(y), it is not possibly to identify string x as an entity name for the given dictionary 106, and therefore dictionary entries do not need to be retrieved from disk to further calculate sim(x,y). Both disk access and the number of string comparisons are reduced. A signature Bloom filter is applied by the signature Bloom filter logic 116 to quickly determine whether d(x) matches any d(y) in a time and space efficient way.

A Bloom filter is a space-efficient probabilistic data structure supporting fast membership testing. An empty Bloom filter B is a bit-array of m bits, all set to zero. To add an element p into B, it is first fed to k independent random hash functions and $h_1(p), \ldots, h_k(p)$ is computed, each mapping p into the range $[0, \ldots, m-1]$; then, $B[h_1(p)]= \ldots =B[h_k(p)]=1$ is set. Values $h_1(q), \ldots, h_k(q)$ are computed to query whether q is a member of the Bloom filter. If $B[h_1(q)]= \ldots =B[h_k(q)]=1$, then the answer to the membership query is Yes; otherwise, the answer to the membership query is answer No.

A Bloom filter has no false negatives (answering No when an element is actually in the filter), but it can cause small false positives (answering Yes when an element is not in the filter). A false positive occurs when an element q is not stored in the filter, but $B[h_1(q)] \ldots B[h_k(q)]$ are all set to 1. The false positive rate for a Bloom filter can be made as small as desired. All the dictionary signatures 110 are stored in a Bloom filter, which is referred to as a signature Bloom filter.

Due to space-efficiency, the signature Bloom filter can easily fit into main memory of the system 100. Bloom filters have a property that time needed to either add items or check set membership of an item is a constant O(k), completely independent of the number of items of the set or the size of the item. Given a query signature d(x), it can be determined whether a possibly matching dictionary entry exists or not in constant O(k) time, regardless of the length of the signature d(x).

A risk of false positives is not critical for the system 100. If a query signature d(x) does not match any dictionary entry signature d(y), but the signature Bloom filter creates a false positive, the system 100 will perform one unnecessary disk access. Since a false positive rate can be set very low, the signature Bloom filter still filters out most of the unnecessary disk accesses. For example, when false positive rate=1%, 99% of unnecessary disk accesses will be filtered out.

In exemplary embodiments, a dictionary entry is treated like a document. An inverted index stores a list of unique tokens from the dictionary vocabulary A. Each token is expressed as a list of dictionary entry identifiers $\{eid_i\}$ to indicate in which dictionary entry the token occurs. Given a query string, a subset of dictionary entries can be retrieved that are most similar to the query. However, efficient retrieval of a small subset of dictionary entries may not be handled well using the inverted index alone.

In the length-based inverted index 112, for each dictionary entry, its signature is stored along with a numeric field having a low computational cost. In particular, field "EntT" stores the number of tokens the entry contains. Then a token in the index is expressed as a list of elements $\{<eid_i,(sig_i, EntT_i)>\}$.

At query time, constraints are placed on the numeric field to efficiently narrow down the search range. Let x be a document string and measure EntT(x). An example query is to "return up to top 10 dictionary entries $\{y_i\}$ where $sig(y_i)=sig(x)$, and $EntT(x)-\theta \leq EntT(yi) \leq EntT(x)+\theta$", where $\theta$ is a small integer.

Parameter $\theta$ ensures that only the dictionary entries having a length that is not much different from the length of the document string can be candidate matches. This constraint is reasonable since if two strings are very different in length, they will not be found similar, no matter what string similarity function sim(x,y) is used.

Making $\theta$ a small value minimizes the set of retrieved dictionary entries. However, $\theta$ cannot be too small such that true candidates are excluded. For named entity extraction, Jaccard similarity as previously described, and a preferred (i.e., provided by a user) string similarity threshold $\delta$, it can be shown that the upper bound of the length difference between a document string and a dictionary entry exists, and the minimal possible value for $\theta$ is this upper bound.

Figure 3:
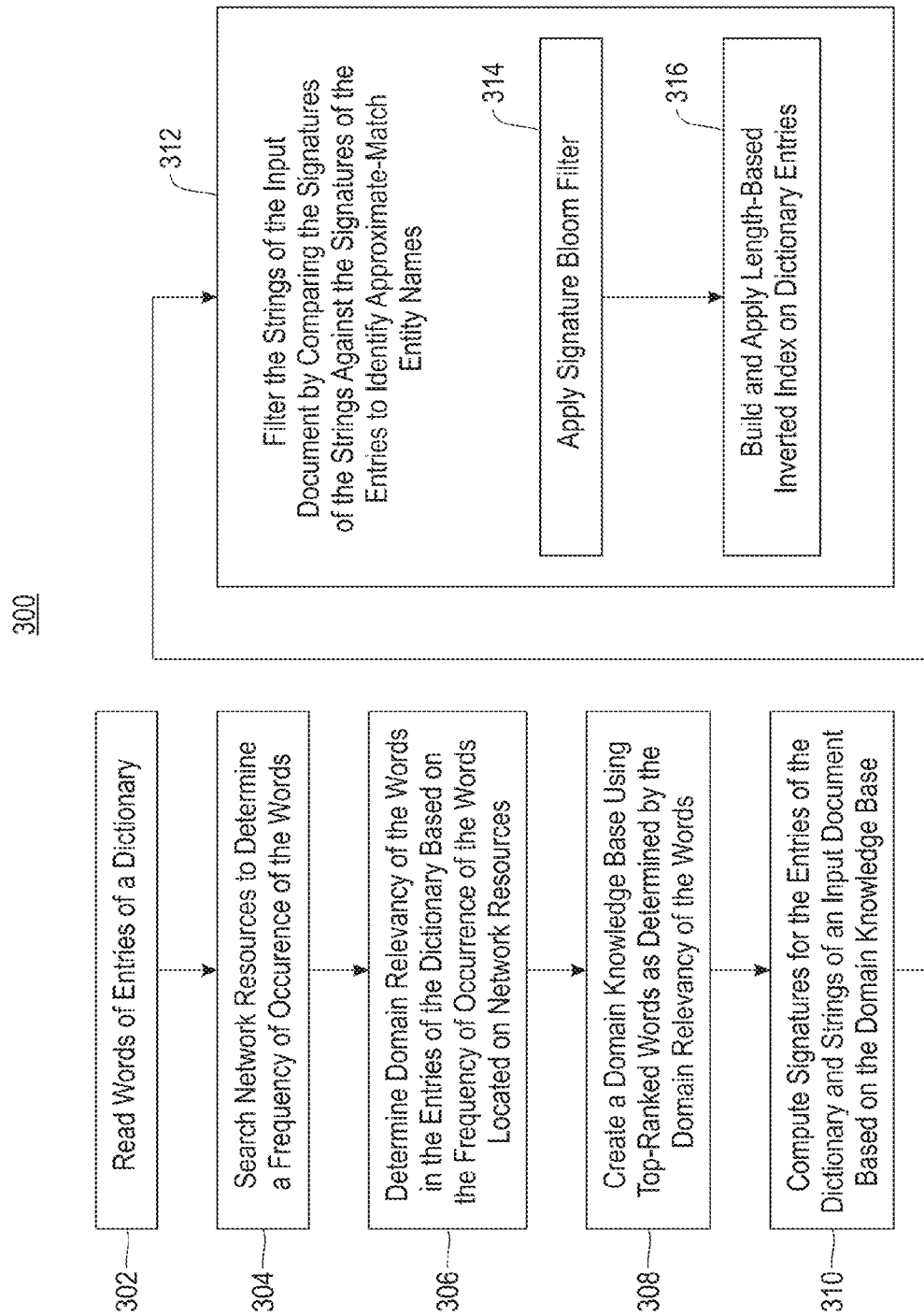
FIG. 3 depicts a process flow for approximate named-entity extraction in accordance with an embodiment.

FIG. 3 depicts a process 300 for approximate named-entity extraction in accordance with an embodiment. The process 300 further summarizes a sequence of operations that can be performed by the system 100 of FIG. 1 and is described herein with reference to FIG. 1.

At block 302, the offline preprocessing component 102 reads words of entries of the dictionary 106. Tokenizing of the words in the entries of the dictionary 106 can be performed to produce a set of tokens for each of the entries of the dictionary 106.

At block 304, the offline preprocessing component 102 searches the network resources 118 to determine a frequency of occurrence of the words. The searching of the network resources can include searching for Web pages containing each of the tokens of the entries of the dictionary 106.

At block 306, the offline preprocessing component 102 determines domain relevancy of the words in the entries of the dictionary 106 in view of the frequency of occurrence of the words located on the network resources 118. The offline preprocessing component 102 can calculate a rank for each token of the entries of the dictionary 106 as a total number of Web pages divided by a number of Web pages containing each token.

At block 308, the offline preprocessing component 102 creates domain knowledge base 108 (also referred to as a "domain repository") using top-ranked words as determined by sorting ranks of the domain relevancy of the words.

At block 310, the offline preprocessing component 102 and the online annotation component 104 compute signatures for the entries of the dictionary 106 and strings of input document 120 as dictionary signatures 110 and document string signatures 114 in view of the domain knowledge base 108. An ordered list of the tokens can be sorted alphabetically for each of the entries and the highest ranked tokens are selected for the signatures.

At block 312, the strings of the input document 120 are filtered by comparing the signatures of the strings against the signatures of the entries to identify approximate-match entity names 122. The filtering can determine similarity between the words in the entries of the dictionary 106 and the strings of the input document 120 in view of content of the words without regard to ordering of the tokens of the entries of the dictionary 106. The filtering can also include determining a longest entry length of the entries in the dictionary 106 and ignoring the strings of the input document 120 that are longer than the longest entry length.

At block 314, as part of the filtering of block 312, the signatures for the entries are stored in a signature Bloom filter, where comparing the signatures of the strings is performed against the signatures of the entries in the signature Bloom filter at the signature Bloom filter logic 116.

At block 316, as part of the filtering of block 312, the length-based inverted index 112 is created as a list of unique tokens from the dictionary 106 indicating entries where the tokens occur, the signatures of the entries, and a number of tokens per entry. A search range is narrowed when filtering the strings using the length-based inverted index 112 to identify approximate matches having matching signatures and a similar length in view of the number of tokens per entry compared to a number of tokens per string of the input document 120.

In one example experiment, 500 biomedical patent documents published in the year 2011 were collected to compose a document collection. The longest document contained 131, 518 tokens. On average each document contained 46,741 tokens. A gene dictionary was composed based on the National Center for Biotechnology Information gene database and a drug dictionary was composed from a variety of drug-related databases. The Bing search Web service was used to get the number of Web pages found to contain search tokens and calculate $W_{rank}$ accordingly. Tokens were also identified using idf. It was shown that the system 100 was effective in filtering out domain-irrelevant words, such as "general", "only", "link", "like", "very", "group", "est", "through", "and", and "special". Setting a similarity threshold as $\delta=0.6$ and constraining the results to at most 20 dictionary entries, it was shown that on average for one document string query, 0.79 dictionary entries were returned by an instance of the length-based inverted index 112, and 2.18 entries were returned by a traditional inverted index. This result showed that the length-based inverted index 112 was very effective in reducing the number of candidate dictionary entries, and therefore reduced the number of string comparisons. Document annotation of each input document 120 was also shown to be orders of magnitude faster using the systems and processes described herein as compared to other present art systems.

Figure 4:
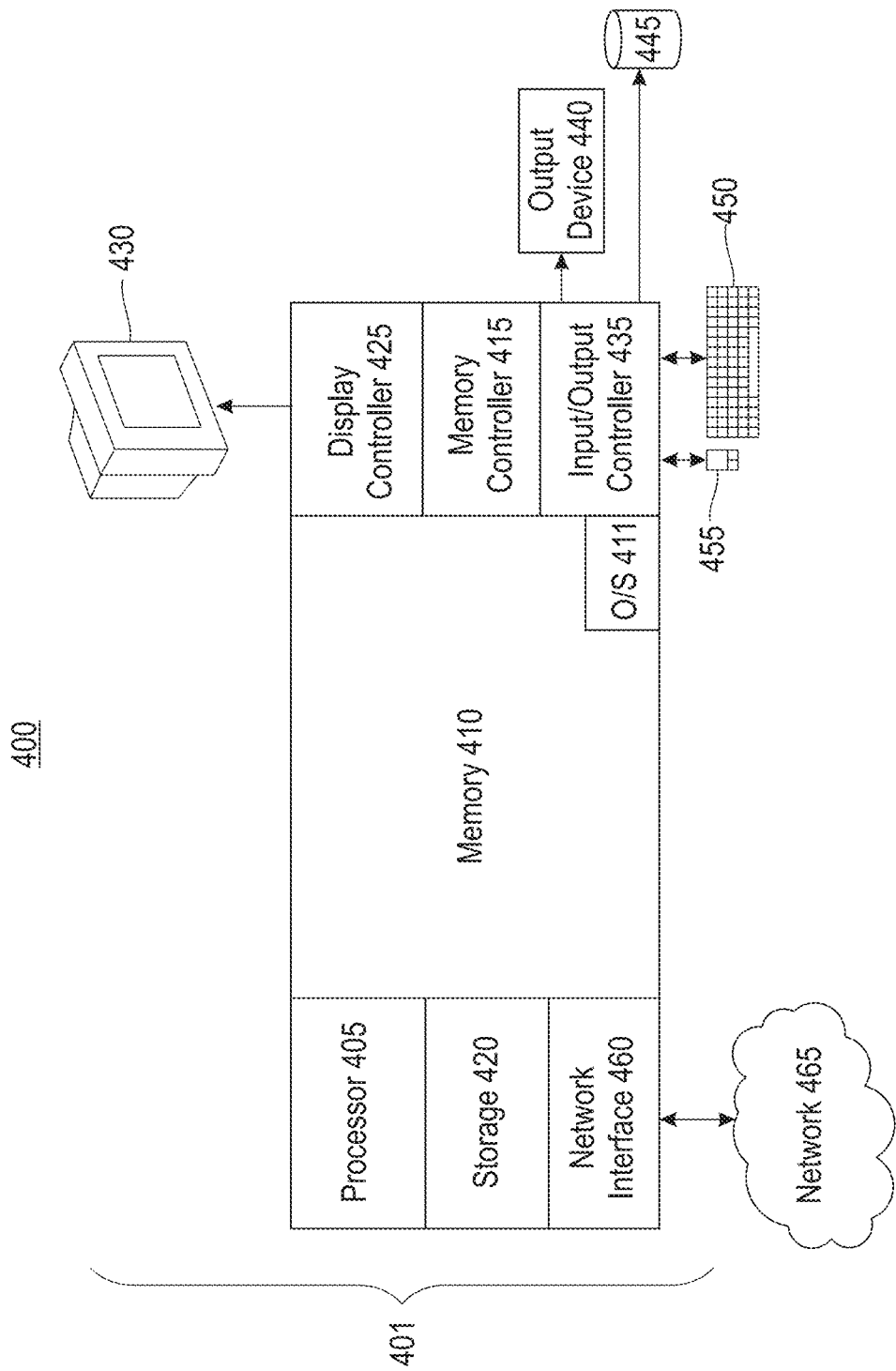
FIG. 4 depicts a computer system for approximate named-entity extraction in accordance with an embodiment.

FIG. 4 depicts a block diagram of a system 400 for approximate named-entity extraction to implement the system 100 of FIG. 1. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore includes general-purpose computer 401 as illustrated in FIG. 4.

In an exemplary embodiment, in terms of hardware architecture, as shown in FIG. 4, the computer 401 includes a processor 405 to perform the offline preprocessing component 102, the online annotation component 104, and associated processes. The computer 401 further includes memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially controls the execution of other computer programs and provides scheduling, input-output control, file and data management, memory management, and communication control and related services.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to fetch and execute instructions stored within the memory 410, to communicate data to and from the memory 410, and to generally control operations of the computer 401 pursuant to the instructions. The various elements of FIG. 1 can reside locally within the memory 410, can be accessed remotely via the network 465, or can be distributed locally and remotely.

In an exemplary embodiment, when implemented in hardware, the methods described herein, such as process 300 of FIG. 3, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The offline preprocessing component 102 and the online annotation component 104 of FIG. 1 can be distributed into multiple functions that can be further distributed in a combination of hardware and software.

Technical effects and benefits include providing approximate named-entity extraction. The approximate named-entity extraction as described herein provides a scalable solution leveraging network resources, such as Web pages, as a knowledge base, and provides rapid filtering and approximate matching through a combination of dictionary and document signatures, a signature Bloom filter, and a length-based inverted index.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for approximate named-entity extraction from a dictionary comprising a plurality of entries, each of the entries including one or more words, the computer program product comprising a non-transitory computer readable storage medium having computer readable program code embodied therewith, the computer readable program code being executable by a computer to perform a method comprising:

reading a plurality of the words from the entries of the dictionary;

searching network resources to determine a frequency of occurrence of the words on the network resources;

in view of the frequency of occurrence of the words located on the network resources, determining domain relevancy of the words in the entries of the dictionary;

creating a domain repository using top-ranked words as determined by the domain relevancy of the words;

in view of the domain repository, computing signatures for both the entries of the dictionary and strings of an input document as representative strings that capture domain-related information based on a domain knowledge base; and filtering the strings of the input document by comparing the signatures of the strings against the signatures of the entries to identify approximate-match entity names, the filtering further comprising:

storing the signatures for the entries in a signature Bloom filter, wherein comparing the signatures of the strings is performed against the signatures of the entries in the signature Bloom filter;

creating a length-based inverted index as a list of unique tokens from the dictionary indicating the entries where the tokens occur, the signatures of the entries, and a number of tokens per entry; and narrowing a search range when filtering the strings using the length-based inverted index to identify approximate matches having matching signatures and a similar length in view of the number of tokens per entry compared to a number of tokens per string of the input document as bounded by a parameter that establishes the search range relative to the number of tokens per string of the input document.

2. The computer program product of claim 1, comprising:
tokenizing the words in the entries of the dictionary to produce a set of tokens for each of the entries; and
determining similarity between the words in the entries and the strings of the input document in view of content of the words without regard to ordering of the tokens.

3. The computer program product of claim 2, comprising:
searching the network resources for Web pages containing each of the tokens;
calculating a rank for each token as a total number of Web pages divided by a number of Web pages containing each token; and
sorting the ranks to determine the top-ranked words.

4. The computer program product of claim 3, comprising:
creating an ordered list of the tokens sorted alphabetically for each of the entries; and
selecting highest ranked tokens for the signatures.

5. The computer program product of claim 1, comprising:
determining a longest entry length of the entries in the dictionary; and
ignoring the strings of the input document that are longer than the longest entry length.

6. A system for approximate named-entity extraction comprising:
memory having computer readable computer instructions;
a dictionary comprising a plurality of entries, each of the entries including one or more words; and
a processor for executing the computer readable instructions to perform a method comprising:
reading a plurality of the words from the entries of the dictionary;
searching network resources to determine a frequency of occurrence of the words on the network resources;
in view of the frequency of occurrence of the words located on the network resources, determining domain relevancy of the words in the entries of the dictionary;
creating a domain repository using top-ranked words as determined by the domain relevancy of the words;
in view of the domain repository, computing signatures for both the entries of the dictionary and strings of an input document as representative strings that capture domain-related information based on a domain knowledge base; and
filtering the strings of the input document by comparing the signatures of the strings against the signatures of the entries to identify approximate-match entity names, the filtering further comprising:
storing the signatures for the entries in a signature Bloom filter, wherein comparing the signatures of the strings is performed against the signatures of the entries in the signature Bloom filter;
creating a length-based inverted index as a list of unique tokens from the dictionary indicating the entries where the tokens occur, the signatures of the entries, and a number of tokens per entry; and
narrowing a search range when filtering the strings using the length-based inverted index to identify approximate matches having matching signatures and a similar length in view of the number of tokens per entry compared to a number of tokens per string of the input document as bounded by a parameter that establishes the search range relative to the number of tokens per string of the input document.

7. The system of claim 6, comprising:
tokenizing the words in the entries of the dictionary to produce a set of tokens for each of the entries; and
determining similarity between the words in the entries and the strings of the input document in view of content of the words without regard to ordering of the tokens.

8. The system of claim 7, comprising:
searching the network resources for Web pages containing each of the tokens;
calculating a rank for each token as a total number of Web pages divided by a number of Web pages containing each token; and
sorting the ranks to determine the top-ranked words.

9. The system of claim 8, comprising:
creating an ordered list of the tokens sorted alphabetically for each of the entries; and
selecting highest ranked tokens for the signatures.

10. The system of claim 6, comprising:
determining a longest entry length of the entries in the dictionary; and
ignoring the strings of the input document that are longer than the longest entry length.

* * * * *